United States Patent

[11] 3,602,461

[72] Inventors  Joseph P. Cody
            Cheltenham;
            Dale W. Walker, Media; Thomas P.
            Mulgrave, Glen Mills, all of, Pa.
[21] Appl. No. 783,929
[22] Filed      Dec. 16, 1968
[45] Patented   Aug. 31, 1971
[73] Assignee   The United States of America as
                represented by the Secretary of the Navy

[54] POLYURETHANE STABILIZER SLEEVE
    3 Claims, 3 Drawing Figs.
[52] U.S. Cl. ........................................................ 244/63
[51] Int. Cl. ....................................................... B64f 1/12
[50] Field of Search ............................................ 244/63,
                                                            110, 115, 116

[56]                References Cited
                UNITED STATES PATENTS
2,962,245  11/1960  Molzan et al. .................. 244/115
3,185,413  5/1965   Walker ........................... 244/63
3,304,031  2/1967   Mulquin .......................... 244/63

FOREIGN PATENTS
764,249  12/1956  Great Britain ................ 244/115

Primary Examiner—Milton Buchler
Assistant Examiner—Paul E. Sauberer
Attorneys—E. J. Brower and A. W. Collins ABSTRACT: The present invention relates to a novel and improved apparatus for restraining an aircraft from a catapult assisted take off until a predetermined required launch force is developed. The improved aircraft restraining or holdback apparatus includes a cable which is secured at one end to the aircraft take off surface and at its other end to a sheer pin retainer assembly that is, in turn, connected through conventional intermediate holdback apparatus components to the aircraft. Pivotal movement of the retainer assembly on the cable is limited by a polyurethane sleeve which surrounds the cable-retainer assembly interconnection and protects it from damage on impact on the takeoff surface during a launching operation.

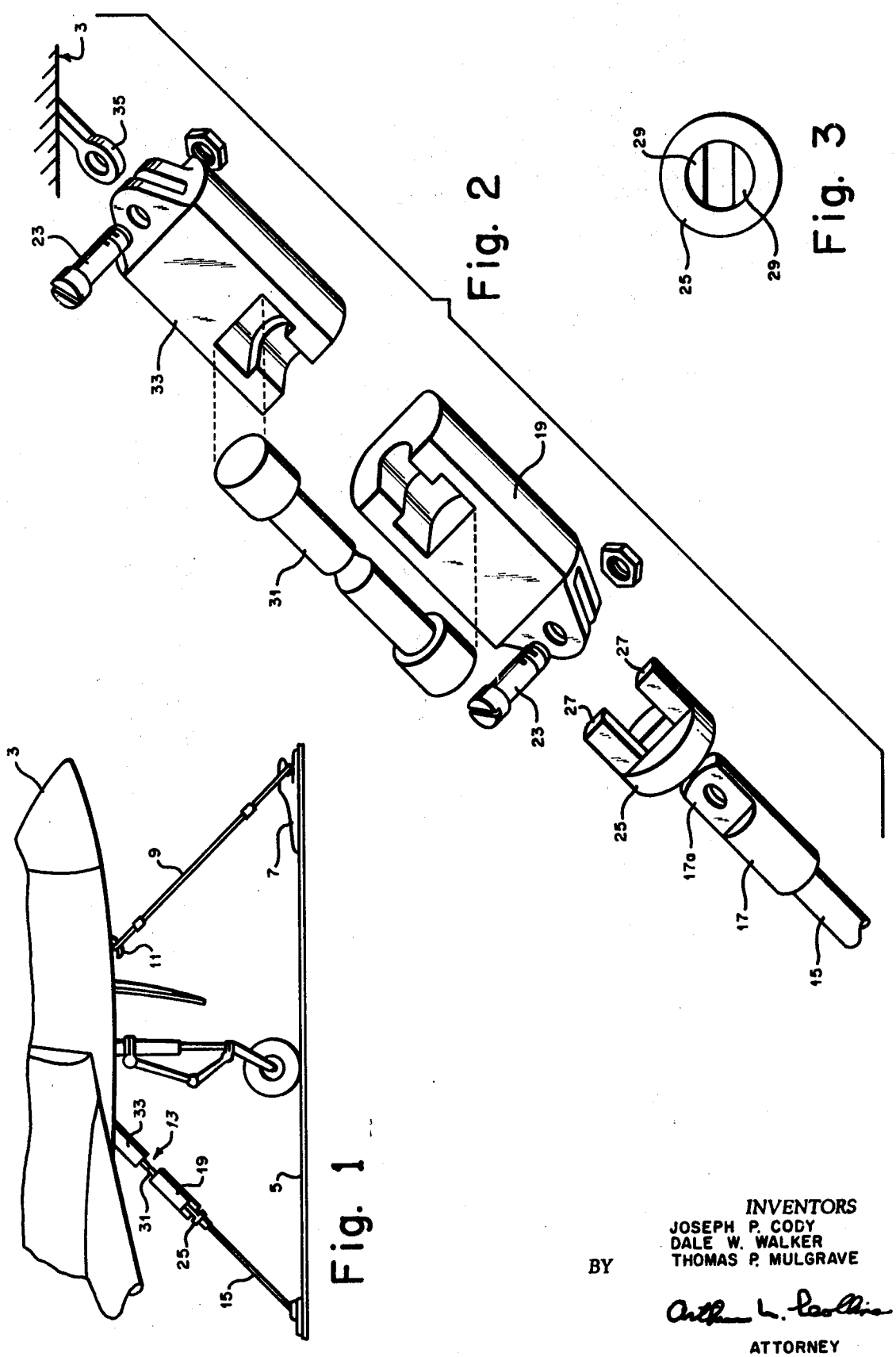

POLYURETHANE STABILIZER SLEEVE

The invention described herein may be manufactured and used by or for the Government of the United States of America for governmental purposes without the payment of any royalties thereon or therefor.

In the art of launching an aircraft from the confined flight deck area of an aircraft carrier or the like, it is customary to supplement the launching force of the aircraft engine with that of a suitable catapult device. Despite this, however, before permitting the aircraft to initiate its takeoff run, it is imperative that adequate launching power is available to be certain that the aircraft will become airborne. It is therefore also customary to restrain movement of the aircraft from its takeoff run until a predetermined adequate launching force is developed. This is normally accomplished by means of an aircraft holdback assembly that includes a tension bar that shears when the predetermined necessary launching force is exceeded. One end of the tension bar is positioned in a tension bar retainer assembly that is secured to the aircraft. The other end of the tension bar is positioned in another tension bar retainer assembly that is secured to the flight deck by means of a flexible steel cable. When the tension bar shears and the aircraft begins its takeoff run, the said other tension bar retainer assembly on the end of the cable is normally propelled violently to the deck. Repeated impacts on the deck severely damage the retainer assembly and its means of interconnection on the end of the cable and impair its continued safe use.

It is therefore a principal object of the present invention to provide a novel and improved aircraft holdback assembly in which damage to its various component parts, as well as the aircraft flight deck itself, is minimized.

It is a further object of the invention to provide a novel and improved aircraft holdback assembly that includes a protective sleeve that surrounds its cable-tension bar retainer assembly interconnection and prevents undue damage on impact on the flight deck during aircraft launching operation.

Other objects and many of the attendant advantages of this invention will be readily appreciated as the same becomes better understood by reference to the following detailed description when considered in connection with the accompanying drawing wherein:

FIG. 1 is a side elevational view of an aircraft in a prelaunch position wherein a preferred embodiment of the invention is illustrated.

FIG. 2 is an enlarged exploded view of the improved aircraft holdback device of the invention; and FIG. 3 is a plan view of the protection sleeve of the holdback device shown in FIG. 2.

Referring now to the various figures of the drawing, it will be noted that the aircraft 3 is shown ready for a launch from the flight deck of an aircraft carrier or other suitable launching surface 5. The launching force is transmitted from a conventional catapult device to the aircraft 3 through the catapult shuttle 7, the launching bridle 9 and the aircraft tow hook 11. Until the required launching force is developed, the aircraft is restrained from its launch by the holdback assembly 13.

The aircraft holdback assembly 13 includes the cable 15 which is secured at one end to the deck or launching surface in any suitable conventional manner. The eyebolt terminal device 17 is swaged or securely affixed to the other end of the cable 15 in any suitable manner. The tension bar or shear pin retainer assembly 19 is bifurcated as at 21 to provide a clevis in which the eyebolt terminal 17 of cable 15 is pivotably secured by the pin or bolt member 23. Rotation of the eyebolt terminal in the clevis of the tension bar retainer assembly 19 is limited by the polyurethane sleeve member 25 which is slidably positioned over the end of the eyebolt terminal 17 and includes the integral projections 27 that engage the end of the retainer assembly 19 between opposed sides of its bifurcated extremity or clevis 21. Integral opposed segments 29 on the inner peripheral surface of the sleeve 25 define an internal rectangular slot through which flattened opposed sides 17a of the terminal 17 pass. Interaction between the segments of the sleeve 25 and the junction of the flattened end portion of the terminal 17 with its full cylindrical exterior contour effects a seat for the terminal 17 on the sleeve 25 and limits its longitudinal sliding movement therealong. Opposite ends of the conventional tension bar or shear pin 31 are positioned and secured in sockets in the retainer assembly 19 and the similar retainer assembly 33 which is secured to the eye member or the like 35 on the aircraft.

In operation, during an aircraft launching operation, the holdback assembly 13 restrains the aircraft from its launch until a predetermined required launching force is developed. When the predetermined required launching force is exceeded, the tension bar 31 shears, and the aircraft propelled by its own power, as well as by that of the catapult shuttle, accelerates toward its launch. When the tension bar 31 shears, the cable 15 and its attached tension bar retainer assembly 19 are slung violently toward the deck. The sleeve 25 prevents the clevised end of the retainer assembly from pivoting on the bolt or pin 23 in the terminal 17 of cable 15. In this way, the damage prone bifurcated extremity of the retainer assembly 19 is not exposed to impact on the deck 5. Instead, the readily replaceable polyurethane protective sleeve 25 absorbs the impact of the cable end and retainer assembly 19 on the deck and damage thereto is minimized.

Obviously, many modifications and variations of the present invention are possible in the light of the above teachings. It is therefore to be understood that within the scope of the appended claims, the invention may be practiced otherwise than as specifically described.

What is claimed is:

1. Apparatus for preliminarily restraining an aircraft from a catapult launch, said apparatus comprising:
    a. a cable secured at one end to an aircraft takeoff surface;
    b. an eyebolt terminal secured to the other end of the cable;
    c. a tension bar retainer assembly which is bifurcated to provide a clevis at one extremity;
    d. pin means securing the eyebolt terminal of the cable to the clevis of the retainer assembly;
    e. and sleeve means limiting pivoting movement of the retainer assembly with respect to the eyebolt terminal on the cable.

2. The apparatus as described in claim 1 wherein the sleeve for limiting pivoting movement of the retainer assembly comprises a sleeve which is positioned over the end of the eyebolt terminal and which includes separate integral projections that engage the retainer assembly between opposed sides of its bifurcated extremity.

3. The apparatus as described in claim 2 wherein the sleeve is a molded polyurethane product.